(12) United States Patent
Saiki

(10) Patent No.: US 8,389,966 B2
(45) Date of Patent: Mar. 5, 2013

(54) AMBIENT LIGHT DETECTING DEVICE FOR A VEHICLE

(75) Inventor: Katsuhiro Saiki, Kariya (JP)

(73) Assignee: Denso Corporation, Kariya (JP)

( * ) Notice: Subject to any disclaimer, the term of this patent is extended or adjusted under 35 U.S.C. 154(b) by 674 days.

(21) Appl. No.: 12/605,687

(22) Filed: Oct. 26, 2009

(65) Prior Publication Data

US 2010/0102212 A1    Apr. 29, 2010

(30) Foreign Application Priority Data

Oct. 29, 2008  (JP) ................. 2008-278729

(51) Int. Cl.
  *G01N 15/06*  (2006.01)
  *G01N 21/49*  (2006.01)
  *G01N 21/85*  (2006.01)
(52) U.S. Cl. ...................... 250/574; 356/436
(58) Field of Classification Search .......... 250/573–574, 250/227.25, 216; 356/436
  See application file for complete search history.

(56) References Cited

U.S. PATENT DOCUMENTS

| 6,313,457 | B1 | 11/2001 | Bauer et al. |
| 6,359,274 | B1 | 3/2002 | Nixon et al. |
| 6,379,013 | B1 | 4/2002 | Bechtel et al. |
| 6,802,631 | B1 | 10/2004 | Hog et al. |
| 6,831,288 | B1 | 12/2004 | Schmitt et al. |
| 8,084,758 | B2 * | 12/2011 | Goto .............................. 250/574 |
| 2003/0053041 | A1 | 3/2003 | Isogai et al. |
| 2003/0160158 | A1 | 8/2003 | Ishino et al. |

FOREIGN PATENT DOCUMENTS

| JP | 62-141727 | 9/1987 |
| JP | 1-78925 | 5/1989 |
| JP | 4-39545 | 9/1992 |
| JP | 2002-39858 | 2/2002 |

OTHER PUBLICATIONS

Japanese Office Action dated Aug. 23, 2010, issued in corresponding Japanese Application No. 2008-278729, with English translation.
Japanese Office Action dated Jan. 13, 2011, issued in corresponding Japanese Application No. 2008-278729 with English translation.

* cited by examiner

*Primary Examiner* — Seung C Sohn
(74) *Attorney, Agent, or Firm* — Nixon & Vanderhye P.C.

(57) ABSTRACT

A light detecting device includes a case, a reflector, and a light receiving element. The case is fixed to a windshield, and outside light passes through the windshield and an entrance hole defined in the case. A predetermined light travels from a predetermined area, and the reflector reflects the predetermined light of the outside light. The light receiving element is disposed in the case to have a distance from the windshield, and the distance is larger than a distance between the windshield and the entrance hole. The light receiving element receives the reflected predetermined light.

14 Claims, 4 Drawing Sheets

US 8,389,966 B2

AMBIENT LIGHT DETECTING DEVICE FOR A VEHICLE

CROSS REFERENCE TO RELATED APPLICATION

This application is based on Japanese Patent Application No. 2008-278729 filed on Oct. 29, 2008, the disclosure of which is incorporated herein by reference in its entirety.

BACKGROUND OF THE INVENTION

1. Field of the Invention

The present invention relates to a light detecting device.

2. Description of Related Art

A light sensor detects illumination intensity outside of a vehicle. The light sensor is mounted to a dashboard of a compartment of the vehicle, or is arranged in a casing of a rain sensor for detecting raindrop when the rain sensor is mounted to a windshield of the vehicle.

JP-A-2003-504270 corresponding to U.S. Pat. No. 6,831,288 discloses a light sensor. The light sensor is arranged in the same casing as a rain sensor, and the light sensor is located inside of the rain sensor in the casing. Visible light passes through a lens of the light sensor, and infrared light passes through a lens of the rain sensor. However, a detection accuracy of the rain sensor may be decreased, due to light transmitted or reflected by the lens of the light sensor.

JP-A-2003-254897 corresponding to US 2003/0160158 A1 discloses a light sensor. The light sensor is arranged in an unused space of a casing of a rain sensor. Thus, light transmitted or reflected by a lens of the light sensor is restricted from affecting a detection accuracy of the rain sensor.

However, plural lenses are arranged in the casing in a manner that a line connecting an entrance hole and a light receiving element is coincident with an optical axis of the lens of the light sensor. Therefore, the light sensor detects only light traveling from a predetermined area having an axis perpendicular to a windshield and a predetermined angle relative to the axis.

If a size of the lens is made larger so as to enlarge a viewing angle of the light sensor, a size of the casing may also have to be made larger. Further, assembling of the plural lenses may be complicated.

SUMMARY OF THE INVENTION

In view of the foregoing and other problems, it is an object of the present invention to provide a light detecting device.

According to an example of the present invention, a light detecting device includes a case, a reflector, and a light receiving element. The case is fixed to a windshield, and outside light passes through the windshield and an entrance hole defined in the case. The reflector reflects a predetermined light of the outside light, and the predetermined light travels from a predetermined area. The light receiving element is disposed in the case to have a distance from the windshield larger than a distance between the windshield and the entrance hole, and receives the reflected predetermined light.

Accordingly, light detection accuracy can be raised.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 3:
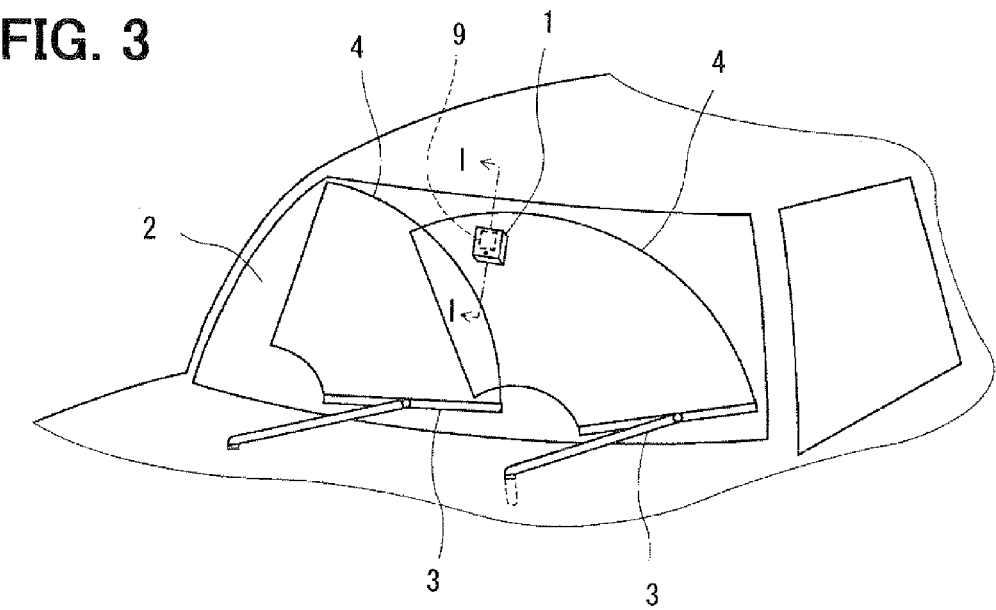
FIG. 3 is a schematic perspective view illustrating a vehicle to which the light detecting device is mounted.

As shown in FIG. 3, a light detecting device 1 is mounted to a windshield 2 of a vehicle, and the vehicle is an example of a mobile unit. The light detecting device 1 is located in a wiper area 4 of a wiper 3 of the windshield 2. The light detecting device 1 is fixed inside of the windshield 2, and may be located at an upper part of the windshield 2 so as not to affect visibility for a driver of the vehicle.

Figure 1:
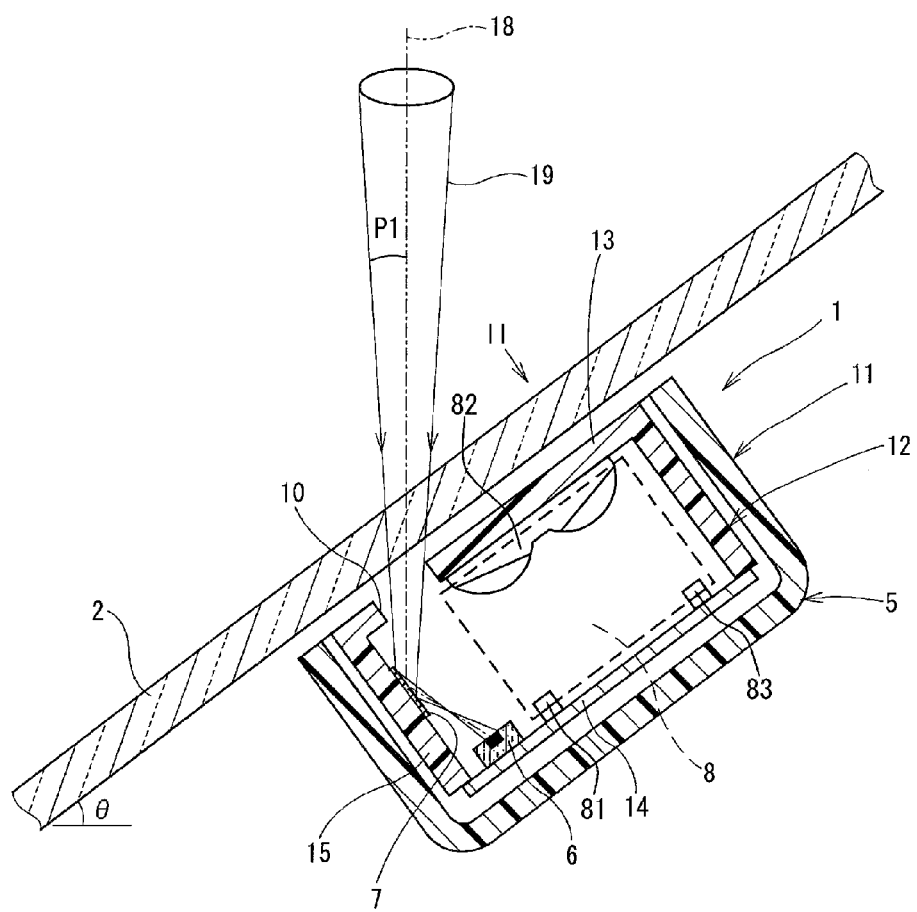
FIG. 1 is a schematic cross-sectional view illustrating a light detecting device according to a first embodiment.
Figure 2:
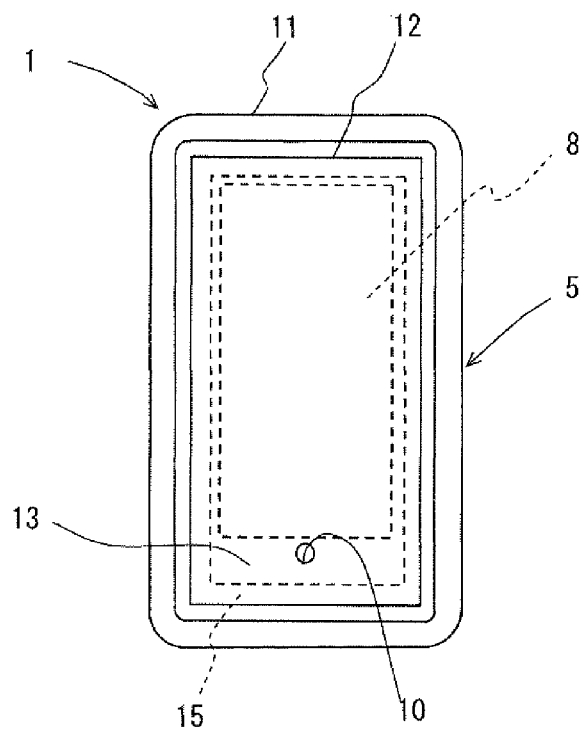
FIG. 2 is a schematic plan view illustrating the light detecting device.

FIG. 1 is a schematic cross-sectional view illustrating the light detecting device 1 taken along line I-I of FIG. 3, and FIG. 2 is a schematic plan view illustrating the light detecting device 1 seen from an arrow direction II of FIG. 1. As shown in FIG. 1, the light detecting device 1 includes a case 5, a light receiving element 6, and a reflector 7. The light detecting device 1 detects illumination intensity outside of the vehicle, and the detected illumination intensity is used for turning on or off a lighting equipment of the vehicle.

An optical sensor such as a rain sensor is arranged in a rain sensor space 8 of the case 5. A light emitting element 81 of the rain sensor emits infrared light, and the emitted infrared light passes through a lens 82 of the rain sensor so as to be transmitted to a detection area 9 of the windshield 2 shown in FIG. 3. The transmitted light is reflected by the detection area 9 of the windshield 2, and a light receiving element 83 of the rain sensor receives the reflected light. An amount of raindrops located in the detection area 9 is detected based on an amount of light received by the light receiving element 83.

A signal corresponding to the amount of raindrops detected by the rain sensor is electrically transmitted to a controlling device, and the controlling device controls a wiper mode of the wiper 3 in accordance with the amount of raindrops. As shown in FIG. 2, the rain sensor space 8 occupies majority of an inner space of the case 5. As shown in FIG. 1, the rain sensor space 8 is positioned on an upper side of the case 5 in a vertical direction. An entrance hole 10 defined in the case 5, the light receiving element 6 and the reflector 7 are located in a small space outside of the rain sensor space 8.

The case 5 is made of a light shielding material such as resin, and has an approximately cuboid shape. The case 5 is fixed to the windshield 2, and the windshield 2 has an inclined angle θ relative to a horizontal direction. The case 5 is constructed with an outer casing 11 and an inner casing 12 arranged inside of the outer casing 11. The inner casing 12 has a first wall 13 adjacent to the windshield 2, and the first wall 13 is arranged to be approximately parallel to the windshield 2. The first wall 13 has the entrance hole 10, and an area of the entrance hole 10 is controlled in a manner that a predetermined amount of light enters the case 5 from outside of the vehicle.

A circuit board 14 is arranged in the inner casing 12. A distance between the windshield 2 and the circuit board 14 is longer than a distance between the windshield 2 and the entrance hole 10. The light receiving element 6 may be constructed by a photo diode or photo transistor, for example, and is fixed on the circuit board 14.

The reflector 7 is a plane mirror disposed on a second wall 15 connecting the first wall 13 and the circuit board 14. For example, the reflector 7 is formed by applying aluminum coating to a surface of the second wall 15.

A predetermined light passes through the entrance hole 10 from a predetermined area 19, and the predetermined area 19 is defined to have an axis 18 and a predetermined angle P1 relative to the axis 18. The axis 18 is a center of the predetermined area 19, and is inclined relative to a normal line of the windshield 2. The predetermined area 19 corresponds to a detectable viewing angle of the light detecting device 1.

A path of the predetermined light traveling from the predetermined area 19 is changed by the reflector 7, and the predetermined light reflected by the reflector 7 travels to the light receiving element 6. The light receiving element 6 receives the reflected predetermined light, and transmits an illumination intensity signal to a controlling device (not shown).

The controlling device compares the signal with a threshold for turning on a lighting equipment such as a head lamp, and controls the lighting equipment to be turned on or off based on the comparison result. A screen board may be disposed in the case 5. Other light different from the predetermined light traveling from the predetermined area 19 is restricted from being transmitted to the light receiving element 6, due to the screen board.

According to the first embodiment, the reflector 7 reflects the predetermined light traveling from the predetermined area 19, when outside light passes through the entrance hole 10. The reflector 7 may reflect only the predetermined light traveling from the predetermined area 19.

In a case that the rain sensor space 8 occupies the majority of the inner space of the case 5, when only a minor space is left in the case 5, illumination intensity of the predetermined light traveling from the predetermined area 19 can be detected by effectively using the minor space. Thus, a size of the light detecting device 1 can be made smaller.

Further, the reflector 7 is constructed by forming the plane mirror on a surface of the second wall 15. Therefore, producing cost of the light detecting device 1 can be reduced, because a structure of the light detecting device 1 is simple.

The rain sensor is arranged in the rain sensor space 8 of the case 5. The rain sensor is located to oppose the reflector 7 arranged on the second wall 15 of the case 5. Therefore, the rain sensor is restricted from being affected by the predetermined light traveling from the predetermined area 19.

Second Embodiment

Figure 4:
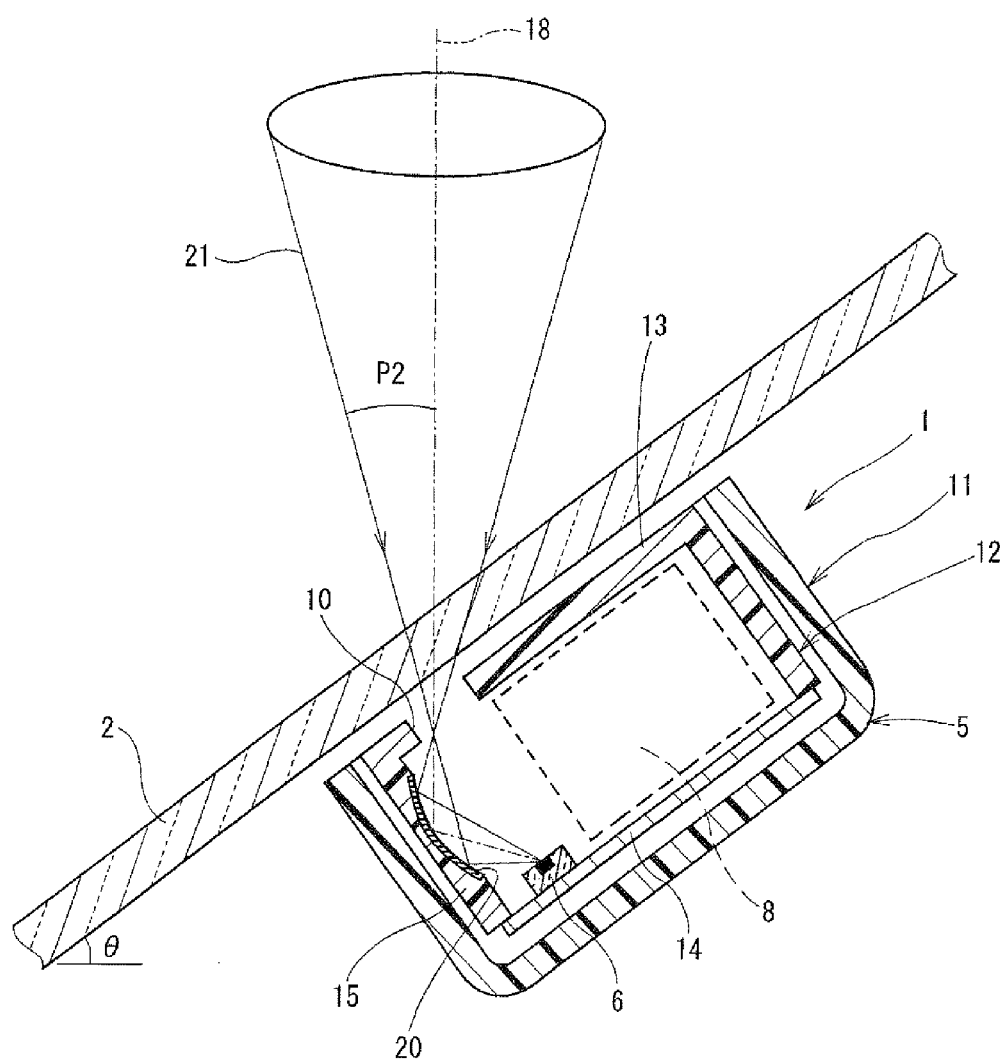
FIG. 4 is a schematic cross-sectional view illustrating a light detecting device according to a second embodiment.

As shown in FIG. 4, a reflector 20 is a concave mirror defined on a second wall 15, in a second embodiment. A surface of the second wall 15 opposing to a rain sensor space 8 is processed to have a curved concave shape recessed from the rain sensor space 8, and the reflector 20 is formed by applying aluminum coating to the curved concave shape of the second wall 15, for example.

A predetermined light passes through an entrance hole 10 from a predetermined area 21, and the predetermined area 21 is defined to have an axis 18 and a predetermined angle P2 relative to the axis 18. The axis 18 is a center of the predetermined area 21, and is inclined relative to a normal line of a windshield 2. The reflector 20 gathers the predetermined light traveling from the predetermined area 21 to a light receiving element 6, due to the concave mirror defining the reflector 20.

The predetermined angle P2 relative to the axis 18 can be set by changing a curvature radius of the reflector 20. That is, the reflector 20 gathers the predetermined light traveling from the predetermined area 21, and the predetermined area 21 is set by changing the reflector 20. The light receiving element 6 receives the gathered predetermined light.

According to the second embodiment, the predetermined light traveling from the predetermined area 21 defined to have the predetermined angle P2 relative to the axis 18 can be detected, because the reflector 20 is constructed by the concave mirror. The predetermined angle is relatively large. For example, the predetermined angle P2 of the second embodiment is larger than the predetermined angle P1 of the first embodiment.

Therefore, in a case that the light detecting device 1 is mounted to a variety of vehicles, if an inclined angle θ of the windshield 2 relative to a horizontal direction is varied, light traveling in an approximately vertical direction can be detected by the light receiving element 6. Accordingly, detection performance of the light detecting device 1 can be improved.

Further, the reflector 20 is arranged on the curved face of the second wall 15. Therefore, if only a minor space is left in the case 5, illumination intensity of the predetermined light traveling from the predetermined area 21 can be detected by effectively using the minor space.

Third Embodiment

Figure 5:
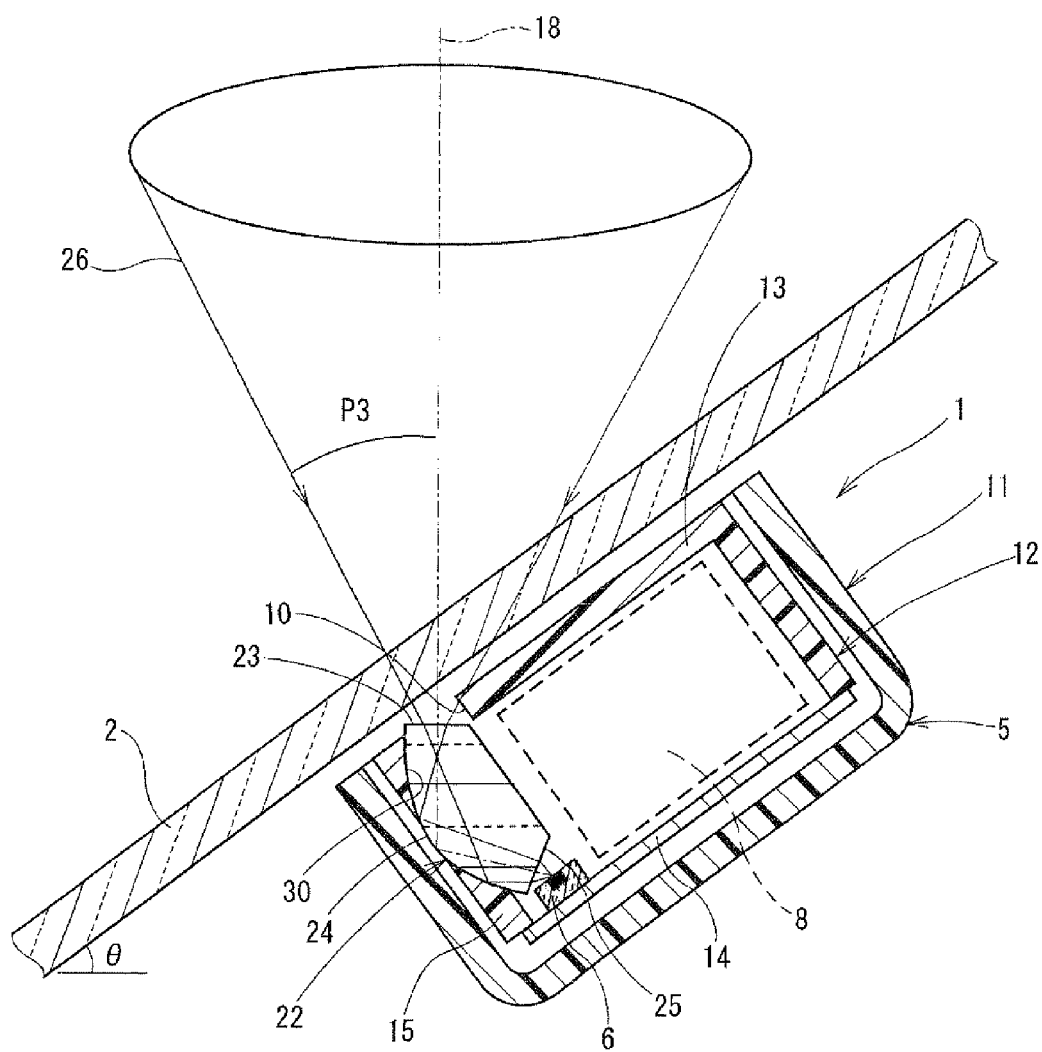
FIG. 5 is a schematic cross-sectional view illustrating a light detecting device according to a third embodiment.

As shown in FIG. 5, a light detecting device 1 includes a light guide 22 in a third embodiment. The light guide 22 may be a lens made of a transparent or translucent resin. The light guide 22 has an entrance face 23, a reflecting face 24, and an exit face 25, in this order in an area from an entrance hole 10 to a light receiving element 6. The reflecting face 24 has a convex shape, and is fitted to a recess 30 defined in a second wall 15, in a manner that a normal line of a center part of the reflecting face 24 is approximately parallel to a first wall 13.

A refractive index of the light guide 22 is larger than that of air. Therefore, light is refracted by the entrance face 23, and the refracted light is incident to the light guide 22.

A predetermined light passes through the entrance hole 10 from a predetermined area 26, and the predetermined area 26 is defined to have an axis 18 and a predetermined angle P3 relative to the axis 18. The axis 18 is a center of the predetermined area 26, and is inclined relative to a normal line of a windshield 2. The predetermined area 26 corresponds to a detectable viewing angle of the light detecting device 1.

When the entrance face 23 extends from an end of the reflecting face 24, the entrance face 23 is inclined to become closer to the normal line of the center part of the reflecting face 24. The entrance face 23 is defined in a manner that the predetermined light traveling from the predetermined area 26 is incident to the entrance face 23 so as to have an incidence angle larger than a critical angle of the reflecting face 24.

An angle defined between the entrance face 23 and the first wall 13 is set approximately equal to an inclined angle θ of the windshield 2 relative to a horizontal direction. Thus, the axis 18 of the predetermined area 26 extends in an approximately vertical direction.

A center part of the entrance face 23 has a curved recess shape (not shown) recessed toward an inner side of the light guide 22. The predetermined angle P3 relative to the axis 18 can be set by the curved recess shape.

The reflecting face 24 has a curved shape protruding toward the outer casing 11 from the inner casing 12. Due to the reflecting face 24, the predetermined light incident to the entrance face 23 from the predetermined area 26 is gathered to the light receiving element 6.

When the exit face 25 extends from an end of the reflecting face 24, the exit face 25 is inclined to become closer to the normal line of the center part of the reflecting face 24. The exit face 25 is inclined relative to the light receiving element 6. All of the predetermined light incident to the entrance face 23 from the predetermined area 26 is reflected by the reflecting face 24, and all of the reflected predetermined light is transmitted to the light receiving element 6 by the exit face 25.

The predetermined light traveling from the predetermined area 26 is refracted by the entrance face 23 to become farther from the axis 18. All of the incident predetermined light is reflected by the reflecting face 24, and all of the reflected predetermined light is emitted from the exit face 25 to the light receiving element 6. In contrast, when other light except for the predetermined light traveling from the predetermined area 26 is incident to the entrance face 23, the other light is not transmitted to the light receiving element 6.

The exit face 25 emits light reflected by the reflecting face 24 toward the light receiving element 6. The reflected light is refracted by the exit face 25 to become closer to an axis corresponding to the axis 18. The light receiving element 6 receives light emitted from the exit face 25.

According to the third embodiment, the entrance face 23 refracts the predetermined light traveling from the predetermined area 26 to become farther from the axis 18 in a traveling direction of light. Therefore, a viewing angle of the light receiving element 6 can be made larger, and detection performance can be improved.

The entrance face 23 is defined in a manner that the predetermined light incident into the entrance face 23 from the predetermined area 26 has an incidence angle larger than the critical angle of the reflecting face 24. The reflecting face 24 reflects all of light having the incidence angle larger than the critical angle. Therefore, light reflection loss generated at the reflecting face 24 can be reduced, and detection performance can be improved. The light reflection loss represents a ratio of an amount of light not reflected toward the light receiving element 6 relative to an amount of light transmitted to the reflecting face 24.

The approximately center part of the entrance face 23 has the curved shape recessed to the inner side of the light guide 22. Therefore, an amount of the predetermined light traveling from the predetermined area 26 can be set to correspond to a detection capacity of the light receiving element 6. Alternatively, the approximately center part of the entrance face 23 may have a curved shape recessed to an outer side of the light guide 22, such that the amount of the predetermined light traveling from the predetermined area 26 can be set to correspond to the detection capacity of the light receiving element 6.

An angle defined between the entrance face 23 and the first wall 13 is set approximately equal to an inclined angle θ of the windshield 2 relative to a horizontal direction. Thus, the axis 18 extends in an approximately vertical direction. Therefore, light traveling in an approximately vertical direction can be included in the predetermined light traveling from the predetermined area 26, such that performance of detecting light traveling in the approximately vertical direction can be improved.

Other Embodiment

The light detecting device 1 detects light traveling in the approximately vertical direction. Alternatively, the light detecting device 1 may detect light traveling in an approximately horizontal direction. The light detecting device 1 detects light having a predetermined angle relative to a normal line of the windshield 2.

The rain sensor is arranged in the case 5 of the light detecting device 1. Alternatively, an optical sensor other than the rain sensor may be arranged in the case 5 of the light detecting device 1. Alternatively, the rain sensor or the other optical sensor may not be arranged in the case 5 of the light detecting device 1.

Such changes and modifications are to be understood as being within the scope of the present invention as defined by the appended claims.

What is claimed is:

1. A light detecting device comprising:
    a case to be fixed to a windshield, outside light passes through the windshield and an entrance hole defined in the case;
    a reflector to reflect a predetermined light of the outside light, the predetermined light traveling from a predetermined area; and
    a light receiving element disposed in the case to have a distance from the windshield, the distance being larger than a distance between the windshield and the entrance hole, wherein the light receiving element receives the reflected predetermined light.

2. The light detecting device according to claim 1, further comprising:
    a circuit board to which the light receiving element is mounted, wherein
    the case has a first wall having the entrance hole, and a second wall connecting the first wall and the circuit board, and
    the reflector is a plane mirror arranged on the second wall.

3. The light detecting device according to claim 1, further comprising:
    a circuit board to which the light receiving element is mounted, wherein
    the case has a first wall having the entrance hole, and a second wall connecting the first wall and the circuit board,
    the reflector is a concave mirror arranged on the second wall,
    the concave mirror gathers the predetermined light to the light receiving element.

4. The light detecting device according to claim 3, wherein the concave mirror is arranged on a curved face of the second wall.

5. The light detecting device according to claim 1, further comprising:
    a light guide made of a transparent or translucent material, wherein
    the light guide has
        an entrance face to which the predetermined light is incident,
        a reflecting face to reflect all of the incident predetermined light, and
        an exit face to emit all of the reflected predetermined light to the light receiving element, and
    the reflector is the reflecting face of the light guide.

6. The light detecting device according to claim 5, wherein the reflecting face of the light guide has a curved shape to gather the incident predetermined light to the light receiving element.

7. The light detecting device according to claim 5, further comprising:
    a circuit board to which the light receiving element is mounted, wherein the case has a first wall having the entrance hole, and a second wall connecting the first wall and the circuit board, and the reflecting face of the light guide has a protruding shape fitted to a recess defined in the second wall.

8. The light detecting device according to claim 5, wherein the entrance face of the light guide is inclined to extend from an end of the reflecting face toward a normal line of an approximately center part of the reflecting face, and the incident predetermined light has an angle larger than a critical angle of the reflecting face.

9. The light detecting device according to claim 5, wherein the entrance face of the light guide has a curved concave shape.

10. The light detecting device according to claim 5, wherein the entrance face of the light guide has an angle relative to the first wall having the entrance hole, the angle is approximately equal to an inclined angle of the windshield relative to a horizontal direction, and the predetermined light includes light traveling in an approximately vertical direction.

11. The light detecting device according to claim 1, further comprising an optical sensor to detect raindrop, wherein the optical sensor is arranged on an upper area of the case in a vertical direction.

12. The light detecting device according to claim 1, further comprising:

a rain sensor arranged in the case, wherein the reflector is disposed on an inner wall of the case, and the rain sensor is located to oppose the reflector.

13. The light detecting device according to claim 1, wherein the predetermined area is defined to have an axis and a predetermined angle relative to the axis, and the predetermined area corresponds to a viewing range of the light receiving element.

14. The light detecting device according to claim 13, wherein the axis is defined to have a predetermined angle relative to a normal line of the windshield.

* * * * *